Nov. 1, 1932.  H. C. LORD ET AL  1,885,457
DIAPHRAGM MECHANISM
Filed March 19, 1928

Hugh C. Lord
Irving P. Whitehouse
INVENTORS.

BY H. C. Lord
ATTORNEYS.

Patented Nov. 1, 1932

1,885,457

UNITED STATES PATENT OFFICE

HUGH C. LORD AND IRVING P. WHITEHOUSE, OF ERIE, PENNSYLVANIA; SAID WHITEHOUSE ASSIGNOR TO SAID LORD

DIAPHRAGM MECHANISM

Application filed March 19, 1928. Serial No. 262,947.

This invention is designed to improve diaphragm mechanisms and to give to such diaphragm mechanisms stability and tension and to form a diaphragm mechanism which may be readily assembled. Features and details of the invention will appear from the specification and claims.

A preferred embodiment of the invention is illustrated in the accompanying drawing as follows:—

Figure 1:
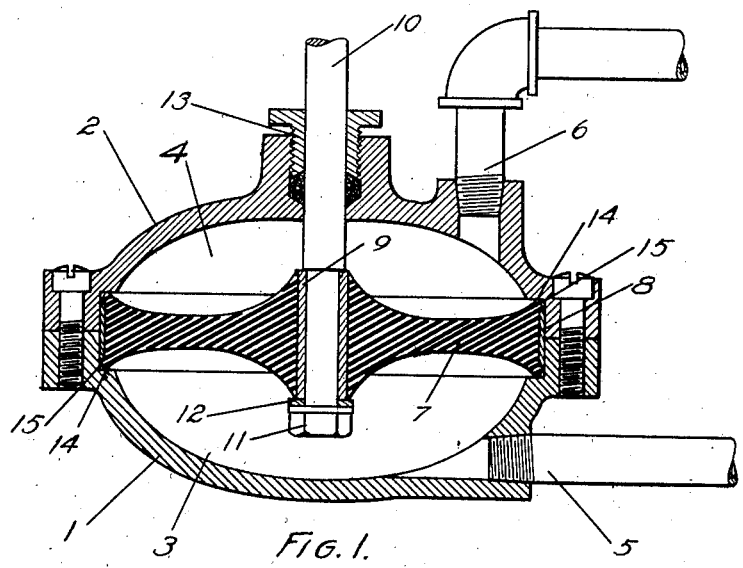

Fig. 1 shows a central section of a diaphragm mechanism.

Figure 2:
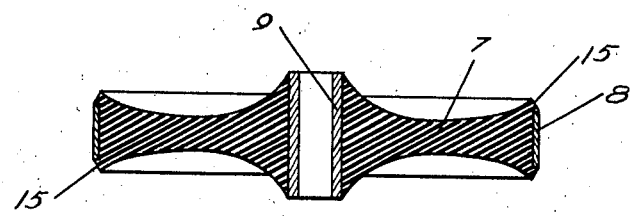

Fig. 2 a section of a detached diaphragm.

Diaphragm plates 1 and 2 enclose chambers 3 and 4. The chamber 3 has a fluid connecting pipe 5 and the chamber 4 may have a fluid connecting pipe 6.

A diaphragm 7 is formed of rubber. It is secured to the inner surface of an outer shell at 8, the association being established during vulcanization and preferably by surface bonding. Where the association is accomplished during vulcanization under heat the diaphragm when cooled is placed under initial tension and, therefore, holds its initial tension and provides tension if returned to such position when in use.

A central pin 9 is secured in the span of the rubber preferably by vulcanization. As shown this is in the form of a hollow pin through which an actuated pin 10 of the diaphragm extends. The pin 10 is secured in the diaphragm by a nut 11 operating on a gasket 12. The pin extends through a stuffing box 13 if the upper chamber 4 is subjected to pressure.

The plates 1 and 2 have seats 14 and the rubber extends sufficiently outside the shell 8 to form a seal on the seats. All that is necessary with the diaphragm is to put it between the diaphragm plates and close them and the diaphragm is ready for operation.

It will be observed that the rubber being subjected to initial radial tension tends to separate the rubber from the shell and also from the pin. By making the rubber thicker at these points and making the wall thinner at intermediate points the flexibility of the diaphragm may be maintained as desired and still provide for a surer union between the rubber and the metallic parts.

What is claimed as new is:—

1. In a diaphragm mechanism, the combination of a diaphragm chamber; a fluid connection leading to the chamber; and a rubber diaphragm forming a wall of the chamber, said rubber being supported at its edge and being under inherent initial tension when in the plane of its support.

2. In a diaphragm mechanism, the combination of a diaphragm chamber; a fluid connection leading to the chamber; and a diaphragm forming a wall of the chamber comprising a rubber element having a metallic ring around the rubber and associated with the rubber during vulcanization, the rubber having initial tension.

3. In a diaphragm mechanism, the combination of a diaphragm chamber; a fluid connection leading to the chamber; a diaphragm forming a wall of the chamber comprising a rubber element having a metallic ring around the rubber and associated with the rubber during vulcanization, the rubber having initial tension; and an operating pin secured by surface bonding in the span of the diaphragm.

4. In a diaphragm mechanism, the combination of a diaphragm chamber; a fluid connection leading to the chamber; and a diaphragm forming a wall of the chamber comprising a rubber element having a metallic shell surrounding the rubber to which the rubber is secured by surface bonding during vulcanization.

5. In a diaphragm mechanism, the combination of a diaphragm chamber; a fluid connection leading to the chamber; a diaphragm forming a wall of the chamber comprising a rubber element having a metallic shell surrounding the rubber to which the rubber is secured by surface bonding during vulcanization; and a pin secured by surface bonding in the span of the diaphragm.

6. In a diaphragm mechanism, the combination of a diaphragm chamber; a fluid connection leading to the chamber; and a diaphragm forming a wall of the chamber in the chamber comprising a rubber element having a metallic ring around the rubber and associated with the rubber during vulcanization, the rubber having initial tension, the rubber at the ring being thicker than intermediate portions of the span.

7. In a diaphragm mechanism, the combination of a diaphragm chamber; a fluid connection leading to the chamber; a diaphragm forming a wall of the chamber in the chamber comprising a rubber element having a metallic ring around the rubber and associated with the rubber during vulcanization, the rubber having initial tension; and an operating pin secured by surface bonding in the span of the diaphragm, the rubber at the pin being thicker than intermediate portions of the span.

8. In a diaphragm mechanism, the combination of a diaphragm chamber; a fluid connection leading to the chamber; a diaphragm forming a wall in the chamber and comprising a rubber element having a metallic ring around the rubber and associated with the rubber during vulcanization, the rubber having initial tension; and an operating pin secured by surface bonding in the span of the diaphragm, the rubber at the ring and the pin being thicker than intermediate portions of the span.

9. In a diaphragm mechanism, the combination of a diaphragm chamber having a diaphragm seat thereon; a fluid connection leading to the chamber; and a diaphragm forming a wall of the chamber comprising a rubber element having a metallic ring around the rubber and said ring being associated with the rubber during vulcanization, the rubber being under initial tension and the rubber extending from the ring and forming a seal with the seat.

10. A diaphragm shaped unit comprising a peripheral metal wall; a rubber wall within the peripheral wall secured to the peripheral wall by surface bonding during vulcanization, the rubber wall being molded with greater thickness at the peripheral wall than at intermediate portions of the rubber wall.

11. A diaphragm shaped unit comprising a metal peripheral wall; a rubber wall within the peripheral wall secured to the peripheral wall by surface bonding during vulcanization; and a central member secured to the span of the rubber wall by surface bonding, the rubber at the central member and at the peripheral wall being molded with greater thickness than intermediate portions of the rubber wall.

12. A diaphragm shaped unit comprising a metal peripheral wall; and a rubber wall within the peripheral wall secured to the peripheral wall by surface bonding during vulcanization, the wall of rubber within the peripheral wall being thinner axially than radially.

13. A diaphragm shaped unit comprising a metal peripheral wall; and a rubber wall within the peripheral wall of less dimension axially than radially secured to the peripheral wall by surface bonding, the wall of rubber at the peripheral wall extending axially from the peripheral wall and forming a sealing surface.

In testimony whereof we have hereunto set our hands.

HUGH C. LORD.
IRVING P. WHITEHOUSE.